(12) United States Patent
Choe et al.

(10) Patent No.: US 8,576,516 B2
(45) Date of Patent: Nov. 5, 2013

(54) MAGNETIC DISC APPARATUS INCLUDING A THERMAL ACTUATOR AS PART OF A TWO-STAGE ACTUATOR

(75) Inventors: Seong-Hun Choe, Fujisawa (JP); Shigeo Nakamura, Odawara (JP)

(73) Assignee: Hitachi, Ltd., Tokyo (JP)

( * ) Notice: Subject to any disclaimer, the term of this patent is extended or adjusted under 35 U.S.C. 154(b) by 254 days.

(21) Appl. No.: 13/105,046

(22) Filed: May 11, 2011

(65) Prior Publication Data

US 2011/0292547 A1 Dec. 1, 2011

(30) Foreign Application Priority Data

May 26, 2010 (JP) ................................ 2010-120369

(51) Int. Cl.
*G11B 5/56* (2006.01)
*G11B 21/24* (2006.01)

(52) U.S. Cl.
USPC ................. 360/294.3; 360/294.6; 360/234.5; 360/234.6

(58) Field of Classification Search
USPC .......... 360/294.3, 294.4, 294.6, 234.4, 234.5, 360/234.6, 245
See application file for complete search history.

(56) References Cited

U.S. PATENT DOCUMENTS

| 5,995,334 | A | 11/1999 | Fan et al. | |
|---|---|---|---|---|
| 7,382,583 | B2 | 6/2008 | Hirano et al. | |
| 8,134,804 | B2* | 3/2012 | Honzawa et al. | 360/245.3 |
| 8,223,461 | B2* | 7/2012 | Huang et al. | 360/294.4 |
| 2003/0035237 | A1* | 2/2003 | Lille | 360/77.07 |
| 2006/0044699 | A1* | 3/2006 | Hirano et al. | 360/294.4 |
| 2007/0183097 | A1* | 8/2007 | Yao et al. | 360/294.4 |
| 2008/0314040 | A1* | 12/2008 | Messner et al. | 60/528 |

FOREIGN PATENT DOCUMENTS

JP 2009-170014 7/2009

OTHER PUBLICATIONS

CMOS MEMS Electrothermal Rotary Actuator for Disk Drives: Performance and Thermal analysis.

* cited by examiner

*Primary Examiner* — Jefferson Evans
(74) *Attorney, Agent, or Firm* — Antonelli, Terry, Stout & Kraus, LLP.

(57) ABSTRACT

A magnetic disc apparatus includes a micro actuator for two-stage actuator having a first stage and a second stage, and a slider mounted to the miro actuator and having a head element to perform recording and reproduction into/from a magnetic disc. A thermal actuator and a spring part are provided on a table, on which the slider is put. The thermal actuator is connected to the slider, and the thermal actuator includes a V-shaped thin film resistance.

6 Claims, 6 Drawing Sheets

MAGNETIC DISC APPARATUS INCLUDING A THERMAL ACTUATOR AS PART OF A TWO-STAGE ACTUATOR

TECHNICAL FIELD

The present invention relates to a magnetic disc apparatus, and more particular, to a magnetic disc apparatus comprising a micro actuator for two-stage actuator, which serves for an improvement in accuracy with which a head element and a slider are positioned relative to a track on a magnetic disc.

BACKGROUND OF THE INVENTION

A magnetic disc apparatus is one, which writes or reads information into and from tracks on a surface of a rotating magnetic disc.

A head element used for writing and reading of information into and from the magnetic disc is mounted to a slider, which forms an ABS (Air Bearing Surface) with the magnetic disc. The slider is mounted on a flexible suspension of a rigid arm to be movable between tracks.

The rigid arm is driven by a VCM (Voice Coil Motor) and the head element is moved to a track for recording by a servo mechanism. As the magnetic disc apparatus is increased in recording density, tracks are decreased in width and pitch and therefore, it becomes difficult to move the head element at high speed to a track for recording by VCM single control.

For example, it is difficult for a servo mechanism of VCM single control to accommodate to a frequency band of 2 kHz or more.

As a solution for an improvement in servo frequency band, two-stage actuators have been proposed. With the two-stage actuator, a VCM is used as a coarse movement actuator in a first stage to perform coarse positioning. Thereafter, fine positioning is performed in a second stage.

In the second stage, a micro actuator for driving a slider is provided between a flexible suspension and the slider. By finely displacing the micro actuator, a head element and a recorded track are positioned accurately to realize a high accuracy and a positioning control in high servo frequency bands.

U.S. Pat. Nos. 5,995,334 and 7,382,583B2 are listed as prior arts of micro actuators for two-stage actuator.

A micro actuator described in U.S. Pat. No. 5,995,334 makes use of MEMS (Micro Electro Mechanical Systems) technology to form a fine movement actuator, a drive source of which is provided by electrostatic attraction, to drive a slider.

U.S. Pat. No. 7,382,583B2 discloses a micro actuator, a drive source of which is provided by a piezoelectric element, to drive a slider. Adoption of a piezoelectric element capable of generating a large force makes it possible to increase a construction in stiffness and to improve controllability on disturbance.

However, a micro actuator making use of electrostatic attraction can generate only a relatively small force, with the result that it is necessary to decrease a construction in stiffness. As a result, there are involved problems that a micro actuator is decreased in mechanical resonance frequency, has a low degree of disturbance tolerance, and is decreased in positioning accuracy.

Also, a micro actuator making use of a piezoelectric element involves problems of generation of dust from the piezoelectric element while a magnetic disc is used, or complexity in a process of assembling a piezoelectric element of a bulk material after manufacture of a substrate, on which actuator is put, with the MEMS technology, and a high manufacturing cost.

It is an object of the invention to provide a magnetic disc apparatus comprising a micro actuator for two-stage actuator, which is used for a magnetic disc apparatus capable of realizing a high accuracy and a simple positioning accuracy.

SUMMARY OF THE INVENTION

In a magnetic disc apparatus including a micro actuator for two-stage actuator, which comprises a first stage and a second stage, and a slider having a head element mounted to the micro actuator to perform recording and reproduction into and from a magnetic disc, a thermal actuator and a spring part are provided on a table, on which the slider is put, and the thermal actuator is connected to the slider, whereby the object is attained.

Also, the thermal actuator and the spring part are formed integral with the table whereby the object is attained.

Also, the thermal actuator comprises a V-shaped thin film resistance whereby the object is attained.

Also, the spring part comprises a parallel flat plate spring whereby the object is attained.

Also, the thin film resistance is formed from silicone and a metal whereby the object is attained.

Also, the thermal actuator is arranged on both sides of the table whereby the object is attained.

Also, the spring part is formed on a surface thereof with a wiring for connection of the slider and the micro actuator whereby the object is attained.

According to the invention, it is possible to provide a magnetic disc apparatus comprising a micro actuator for two-stage actuator, which is used for a magnetic disc apparatus capable of realizing a high and simple positioning accuracy.

DESCRIPTION OF THE EMBODIMENT

Prior to an explanation of an embodiment of the invention, outline of a general magnetic disc apparatus will be described with reference to FIG. 9.

Figure 9:
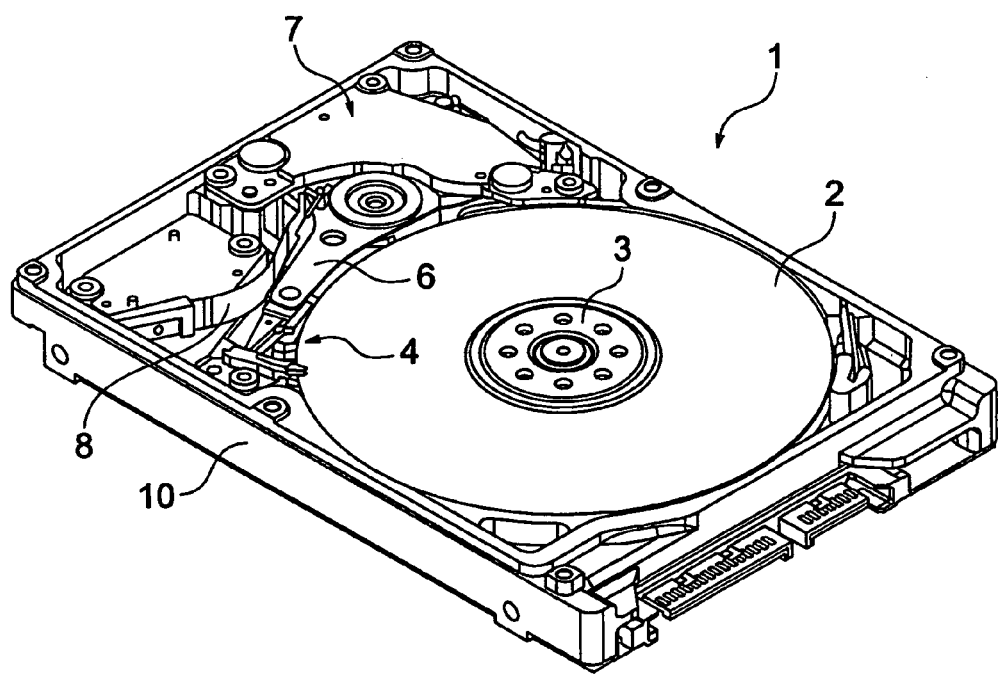
FIG. 9 is a perspective view showing a general magnetic disc apparatus.

FIG. 9 is a perspective view showing a general magnetic disc apparatus.

In FIG. 9, the magnetic disc apparatus 1 receives a magnetic disc 2, a head support 6, etc. in an enclosure 10 (DE: Disk Enclosure). In addition, depiction of a cover being a part of the enclosure 10 is omitted in the drawing.

The magnetic disc 2 is mounted to a spindle motor 3 serving as a disc actuator. A plurality of tracks (not shown) arranged in concentric circles are formed on the magnetic disc 2, and address data and servo data including a burst signal are written at predetermined periods on each track.

The head support 6 is born adjacent to the magnetic disc 2. A magnetic head slider 4 according to an embodiment of the invention is supported on a tip end of the head support 6. The magnetic head slider 4 flies closely above the rotating magnetic disc 2 to write and read data thereinto and therefrom.

On the other hand, a voice coil motor 7 serving as a head actuator is provided at a rear end of the head support 6. The voice coil motor 7 swingingly drives the head support 6 to move the magnetic head slider 4 substantially radially of the magnetic disc 2.

The magnetic head slider 4 and the voice coil motor 7 are connected electrically to a circuit substrate (not shown) provided on a back side of the enclosure 10 through a FPC (Flexible Printed Circuits) 8 mounted to the head support 6.

It has been difficult to accurately position a head at one point in a state, in which an increase in recording density is brought about and the recording density every track is great. That is, it is quite difficult to accurately position a head at one point in a state, in which a disc rotates at speed as high as 7000 RPM.

In such circumstances, in which positioning is difficult, there are constructions, in which an electrostatically driving actuator is secondly mounted and in which driving by a piezoelectric element is performed, as disclosed in U.S. Pat. Nos. 5,995,334 and 7,382,583B2. However, such constructions have a low degree of disturbance tolerance and a disadvantageous aspect in terms of manufacturing cost.

Hereupon, the inventors of the present application have thought of using a thermal actuator. That is, when heated by the passage of electric current, the neighborhood of a thermal actuator thermally expands to enable fine adjustment of a bent position.

An embodiment of the invention will be described hereinafter with reference to the drawings.

[Embodiment 1]

Figure 1:
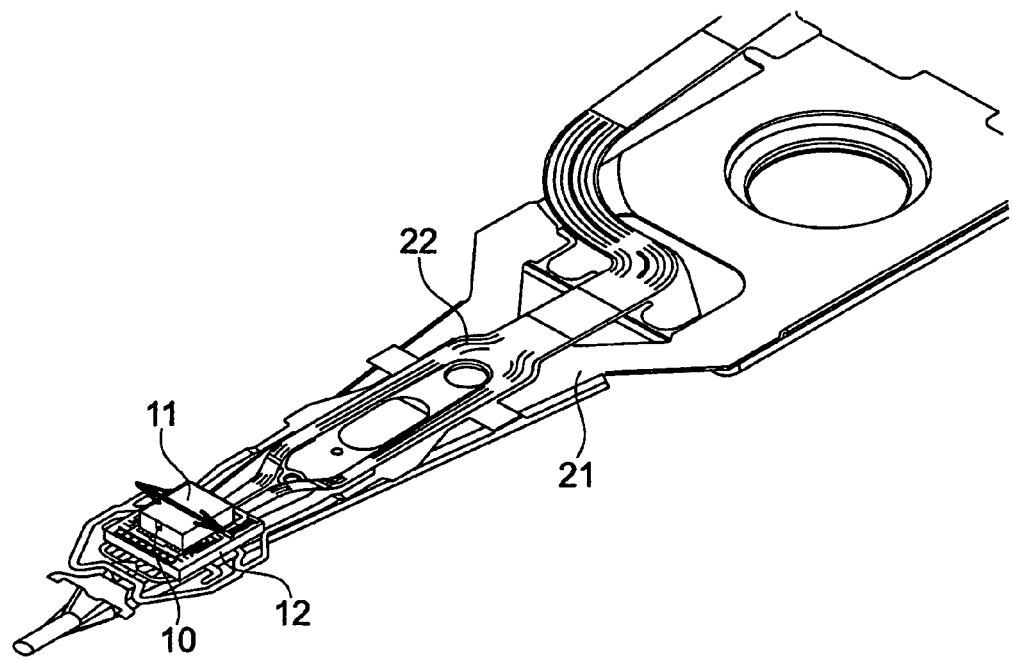
FIG. 1 is a perspective view showing construction of a head support on a magnetic disc apparatus according to an embodiment of the invention.

FIG. 1 is a perspective view showing a micro actuator for two-stage actuator, according to an embodiment of the invention.

In FIG. 1, the magnetic disc apparatus 1 shown in FIG. 9 comprises a flexible suspension 21, a micro actuator 12, a slider 11, and a head element 10. The micro actuator 12 and the slider 11 are mounted at a tip end of the flexible suspension 21. An electric signal is transmitted through a flexible substrate wiring 22 to the micro actuator 12 for two-stage actuator from a controller of the magnetic disc apparatus 1.

The slider 11 and the head element 10 are adapted to be driven by the micro actuator 12 to be finely displaced in a track widthwise direction (arrow direction).

Figure 2:
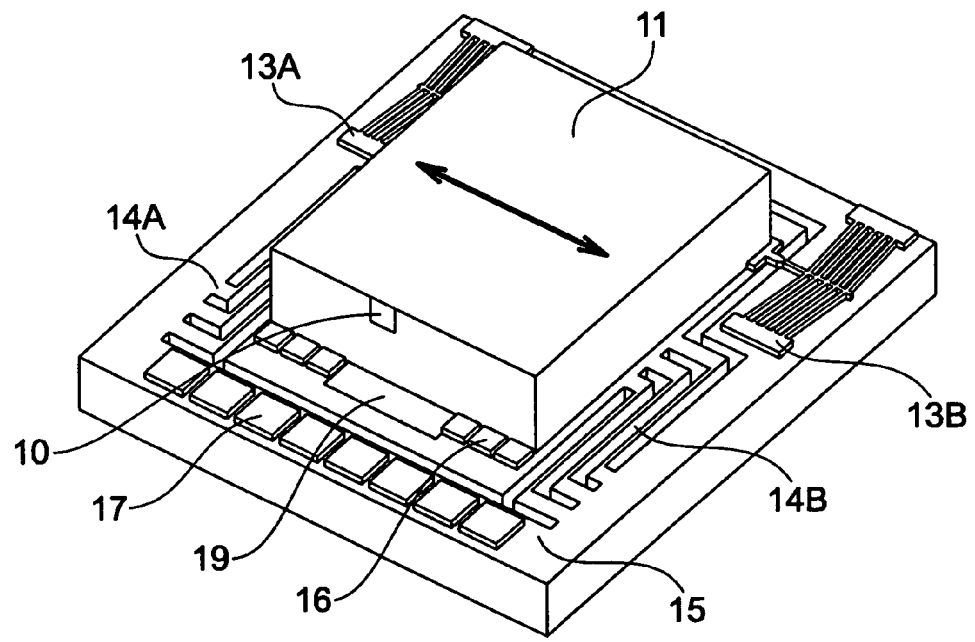
FIG. 2 is a perspective view showing a micro actuator and a slider on the magnetic disc apparatus according to the embodiment of the invention.

FIG. 2 is a perspective view showing the slider according to an embodiment of the invention.

In FIG. 2, a table 18 (shown in FIG. 3), on which the slider 11 is put, and thermal actuators 13 (13A, 13B) for movement of the table 18 are mounted to the micro actuator 12 shown in FIG. 1. Parallel flat plate springs 14 (14A, 14B) serve to support the table 18 and to move the table 18 in the track widthwise direction (arrow direction).

Electrodes 17 for connection of an electric signal to the flexible suspension 21 shown in FIG. 1 are formed at a tip end of a substrate 15 of the micro actuator 12. Electrodes 16 for the slider 11 and the head element 10 are formed at a tip end of the table 18. The electrodes 17A, 17B at the tip end of the substrate are connected to the electrodes 16 by thin film wirings formed on the parallel flat plate springs 14A, 14B.

Six electrodes out of eight electrodes 17 formed at the tip end of the table 18 are connected to the slider 11 and are used as write and read signals for the head element 10. The remaining two electrodes 17 are used as ones for driving the thermal actuators 13 of the micro actuator 12. The head element 10 is mounted on the slider 11 which is mounted on the table 18 of the micro actuator 12 and a laser diode 19 for thermal assist recording is mounted on a lower portion of the slider 11.

The micro actuator 12 has a dimension in the order of 1.5 mm×1.5 mm×0.4 mm, which is a little larger in dimension than Femto sliders (0.7 mm×0.8 mm×0.2 mm) used at present.

Figure 3:
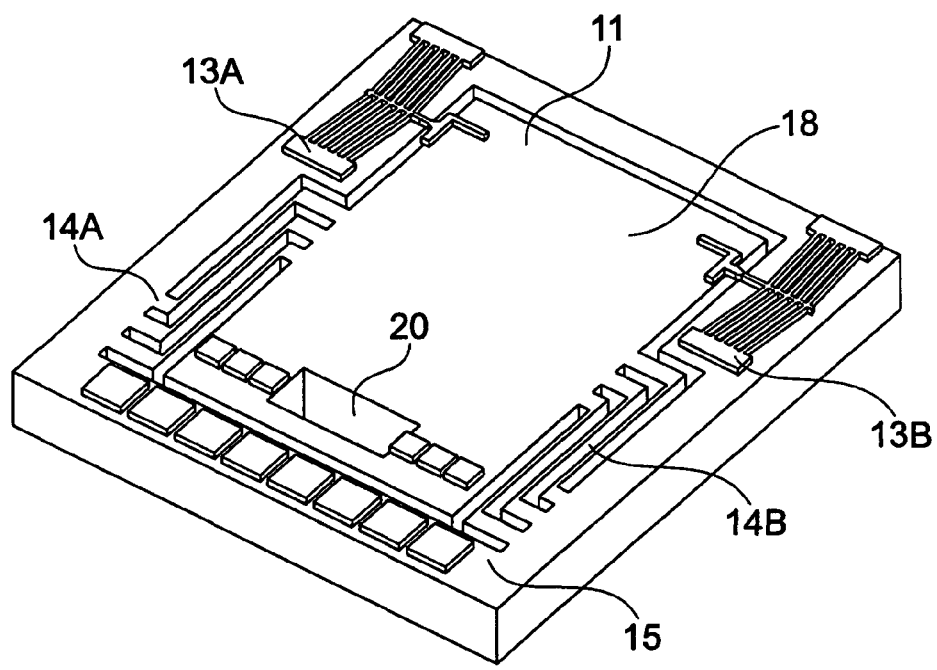
FIG. 3 is a perspective view showing the micro actuator on the magnetic disc apparatus according to the embodiment of the invention.

FIG. 3 is a perspective view showing a micro actuator according to an embodiment of the invention.

In FIG. 3, two thermal actuators 13A, 13B are mounted on a rear portion of the substrate 15 of the micro actuator 2, and the thermal actuators 13A, 13B are fixed to the substrate 15 by means of anchors on both sides. The thermal actuators 13A, 13B are formed in the form of five arrays, which form a V-shaped resistance, and separated from the substrate at an interval of 0.5 μm to 1 μm. The thermal actuators 13 are sized to have a length of about 400 μm and a section of 15 μm×10 μm. When the thermal actuators 13A, 13B are driven, they push (rightwardly upward) and pull (rightwardly downward) the table 18 at a center to thereby move the table 18. Silicone and a metal, such as Ni, Cu, Al, etc., attachment of which is accomplished by a thin film, can be used as a material for the thermal actuators 13A, 13B.

The table 18 at the center is supported on the surrounding substrate by six parallel flat plate springs 14A, 14B. When acted by forces from the thermal actuators 13A, 13B, the parallel flat plate springs 14A, 14B enable the table 18 to be displaced in the track widthwise direction without turning. The parallel flat plate springs 14A, 14B are designed so that the whole micro actuator has a resonance frequency of 16 kHz or more, and substantially have a length of 200 μm to 600 μm and a width of 10 μm to 50 μm. The parallel flat plate springs 14A, 14B together with the substrate 15 are manufactured in a batch manufacturing process and silicone and a metal, such as Ni, Cu, Al, etc. can be used as a material therefor.

A square-shaped space is formed on the table 18 to function to mount thereon the laser diode 19 for thermal assist recording, and the laser diode 19 is mounted therein. A size of the space for the laser diode 19 is different depending upon the laser diode 19 as used.

Figure 4:
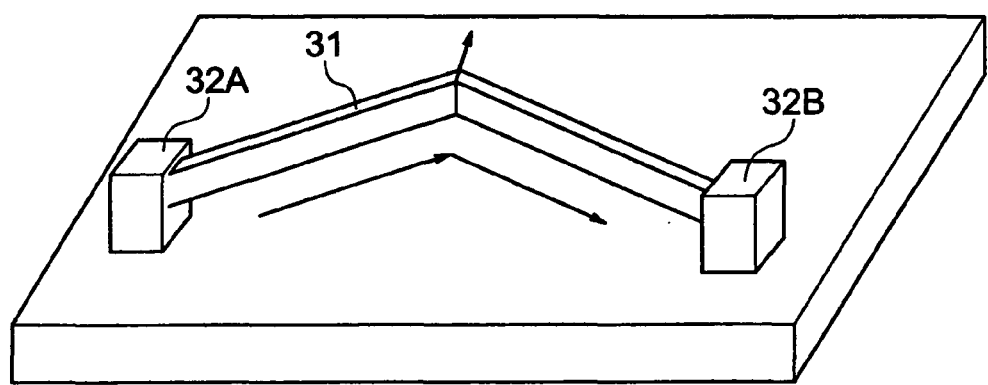
FIG. 4 is a perspective view showing a thermal actuator according to an embodiment of the invention.

FIG. 4 is a perspective view illustrating outline of the thermal actuator according to the embodiment of the invention.

In FIG. 4, the thermal actuators 13A, 13B serve as a drive source for driving the table 18 and are formed from a thin film resistance 31. Silicone and a metal, such as Ni, Cu, Al, etc. can be used as a material for the thin film resistance 31. The thin film resistance 31 is formed to be V-shaped and has its both sides fixed to the substrate by means of the anchors 32A, 32B.

Upon application of electric voltage through the anchors 32A, 32B on the both sides, an electric current flows through the V-shaped thin film resistance 31 to generate Joule heat. When the Joule heat generates, the thin film resistance 31 thermally expands due to temperature rise to be displaced rightwardly upward in FIG. 4 because the anchors 32A, 32B are constrained and the thin film resistance 31 is formed to be V-shaped. When application of electric voltage is stopped, the thin film resistance 31 releases heat due to heat conduction to the substrate and convection current of a surrounding atmosphere to be returned to an original temperature to be returned to an original state.

In positioning the thermal actuators 13A, 13B on the magnetic disc apparatus, a matter of most concern resides in frequency response characteristics. It is required that frequency band width of the thermal actuators be made approximately three times as large as that of a demanded positioning. In case where the frequency band width of a positioning, for example, is 4 kHz, the frequency band width of the thermal actuators must become 12 kHz, that is, three times as large as the former. This means that the time constant is required to be 13

$$\left(\text{time constant}, t = \frac{1}{2\pi f}\right)$$

However, it is very difficult to realize the thermal actuators 13A, 13B, which can realize the above time constant. It is possible to decrease the thermal actuators 13A, 13B in dimension to achieve an increase in heat release efficiency, thereby achieving a decrease in time constant to accommodate to a frequency band width, but in which case, a force required to drive the micro actuator 12 will not generate.

Accordingly, the use of the thermal actuators 13A, 13B is accommodated by incorporating a Lead compensation mechanism into a control system. According to control theory, an about 10-fold increase in band width is made possible by the incorporation of a Lead compensation mechanism. Accordingly, a positioning frequency band width of 4 kHz is made possible by designing the thermal actuators 13A, 13B so as to provide for the time constant of 130 μs (=13 μs*10) and incorporating a Lead compensation mechanism into a control system.

FIGS. 5A to 5D are views stepwise showing a manner, in which the thermal actuator drives.

Figure 5A:
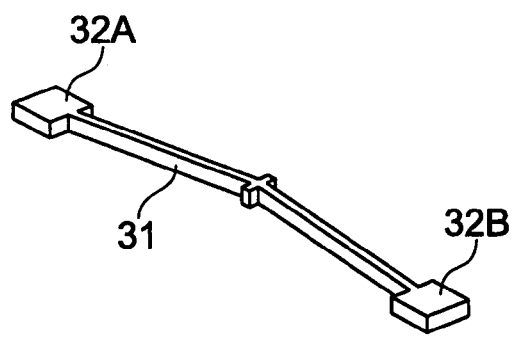
FIGS. 5A to 5D are perspective views stepwise showing a manner, in which the thermal actuator according to the embodiment of the invention is driven.
Figure 5B:
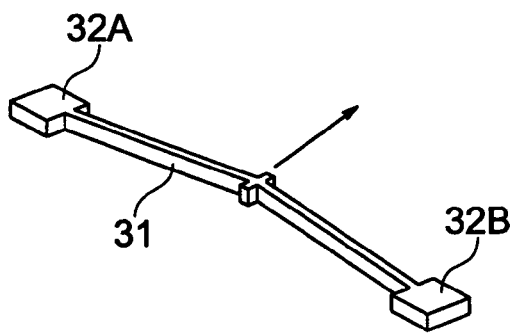
Figure 5C:
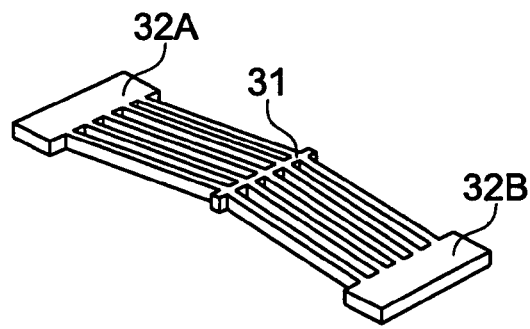
Figure 5D:
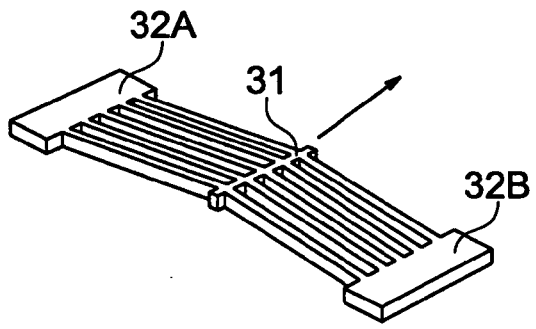

FIG. 5A shows a manner, in which the thermal actuator is deformed before application of electric voltage. FIG. 5B shows a manner of movement due to thermal expansion caused by heat generation upon application of electric voltage. Also, in order to make the resonance frequency of the micro actuator 12 equal to or larger than 16 kHz, it is necessary to increase the stiffness of the parallel flat plate springs 14A, 14B, which support the table 18. In this case, it is essential to increase that force generated by the actuator, which is required to get a necessary displacement. Accordingly, as shown in FIGS. 5C and 5D, it is necessary to arrange resistances in parallel and in arrays to achieve an increase in the force as generated. Arrows indicate directions of displacement.

The function of the parallel flat plate springs will be described with reference to FIGS. 6 and 7.

Figure 6:
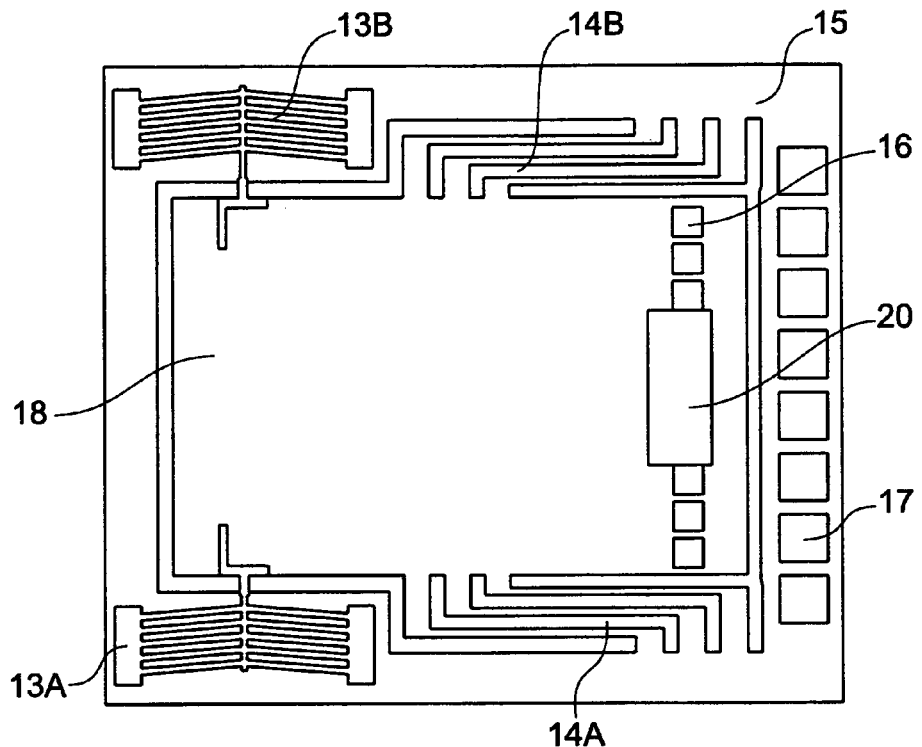
FIG. 6 is a plan view showing the micro actuator on the magnetic disc apparatus according to the embodiment of the invention.

FIG. 6 is a plan view showing the micro actuator 12 for two-stage actuator.

Figure 7A:
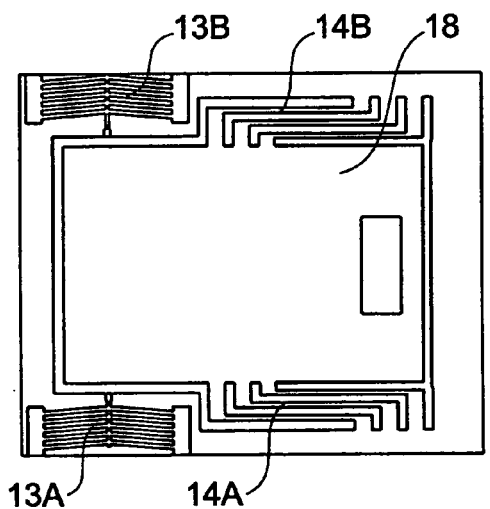
FIGS. 7A and 7B are plan views showing a manner, in which a table is driven by parallel flat plate springs of the micro actuator on the magnetic disc apparatus according to the embodiment of the invention.
Figure 7B:
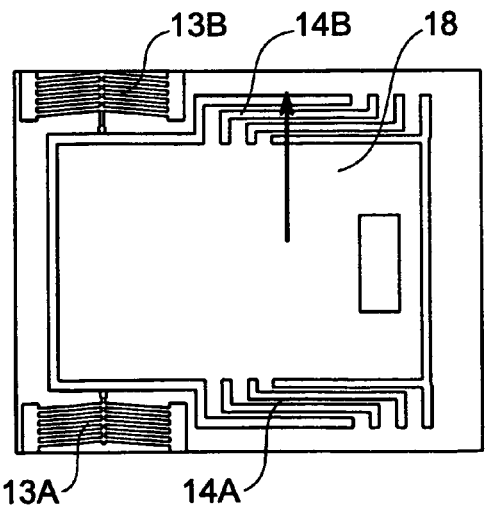

FIGS. 7A and 7B are views showing a manner, in which the micro actuator 12 is driven by driving of the thermal actuators.

In FIG. 6, the parallel flat plate springs 14A, 14B, respectively, are formed around the table 18 by three beams to support the table 18 on the substrate 15 of the micro actuator 12. The parallel flat plate springs 14A, 14B are formed in parallel to recording tracks to move in the track widthwise direction when the head element/slider is finely displaced by driving of the thermal actuators 13A, 13B. Also, the parallel flat plate springs 14A, 14B are designed so that the whole table 18 has a resonance frequency of 16 kHz or more, and substantially have a length of 200 μm to 600 μm and a width of 10 μm to 50 μm. The parallel flat plate springs 14A, 14B are formed to have the same thickness as that of the substrate 15, and the thickness is about 100 μm to 250 μm. The parallel flat plate springs 14A, 14B together with the substrate 15 are manufactured in a batch manufacturing process and silicone and a metal, such as Ni, Cu, Al, etc. can be used as a material therefor.

The thermal actuators 13A, 13B are formed leftwardly upwardly of and leftwardly downwardly of the substrate 15 on the micro actuator 12, and upon application of electric voltage, the thermal actuators 13A, 13B are disposed leftwardly upward to pull the table 18 and the thermal actuators 13A, 13B are disposed leftwardly downward to push the table 18.

Upon application of electric voltage to the thermal actuators 13A, 13B as shown in FIG. 7A, the thermal actuators 13A, 13B on the both sides are displaced as shown in FIG. 7B, so that the table 18, on which the slider 11 is put, moves in an upward direction (arrow direction) due to deformation of the parallel flat plate springs 14A, 14B. This movement causes the slider 11 to be finely displaced in the track widthwise direction. When application of electric voltage is stopped, the thin film resistance 31 forming the thermal actuators 13A, 13B releases heat due to heat conduction to the substrate 15 and convection current of a surrounding atmosphere to be returned to an original temperature, so that the table 11 is returned to an original state.

[Embodiment 2]

Figure 8:
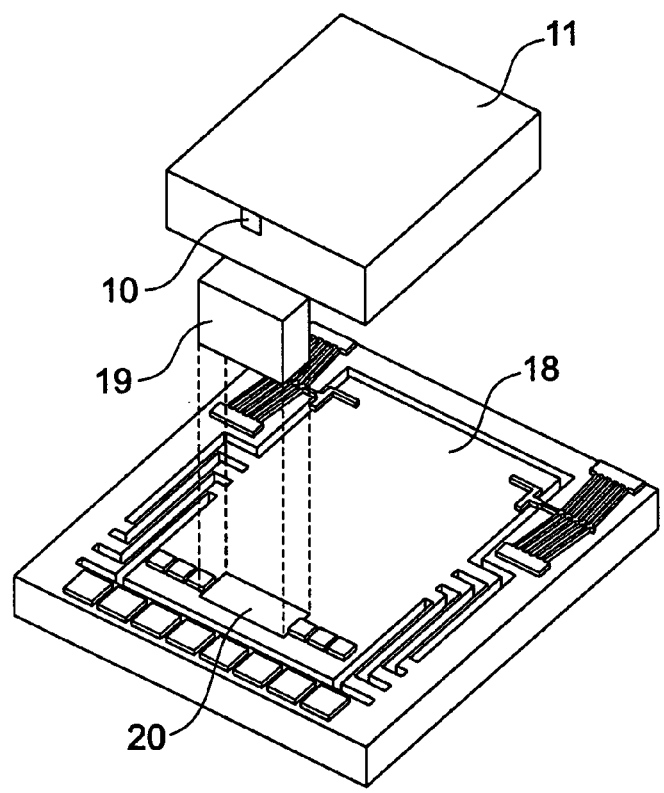
FIG. 8 is a perspective view showing configuration of the micro actuator of the magnetic disc apparatus, according to the embodiment of the invention, and a laser diode for thermal assist recording.

FIG. 8 is a perspective view showing configuration of the micro actuator 12 of the magnetic disc apparatus, according to the embodiment of the invention, and the laser diode for thermal assist recording.

The mount construction of the laser diode 19 on the micro actuator 12 will be described with reference to FIG. 8. The laser diode 19 for locally heating a recording portion of the magnetic disc surface is provided in order to increase the magnetic disc apparatus 1 in recording density. Ordinarily, there is adopted a construction, in which the laser diode 19 is fixed to (mounted on) a hexahedron-shaped structure attached to the slider 11.

According to the invention, a space, in which the laser diode 19 is received, is provided on the table 18 of the micro actuator 12 and the laser diode is mounted in the space. Combined use of the micro actuator 12 as a laser diode mount produces an effect that the micro actuator 12 and the laser diode 19 can be mounted in a limited space within the magnetic disc apparatus 1.

As described above, according to the invention, a construction of high stiffness can be realized by adopting a thermal actuator, which generates a large force, in the micro actuator 12 for driving a slider of a magnetic disc apparatus, and it is possible to achieve an increase in resonance frequency and to realize a high accuracy and a simple positioning accuracy.

Also, by adopting parallel flat plate springs, the head element/slider is finely displaced laterally of tracks to enable realizing a positioning accuracy.

Further, according to the invention, since parallel flat plate springs have a high stiffness, the micro actuator 12 has a high resonance frequency to have a high degree of controllability on disturbance.

Figure 10:
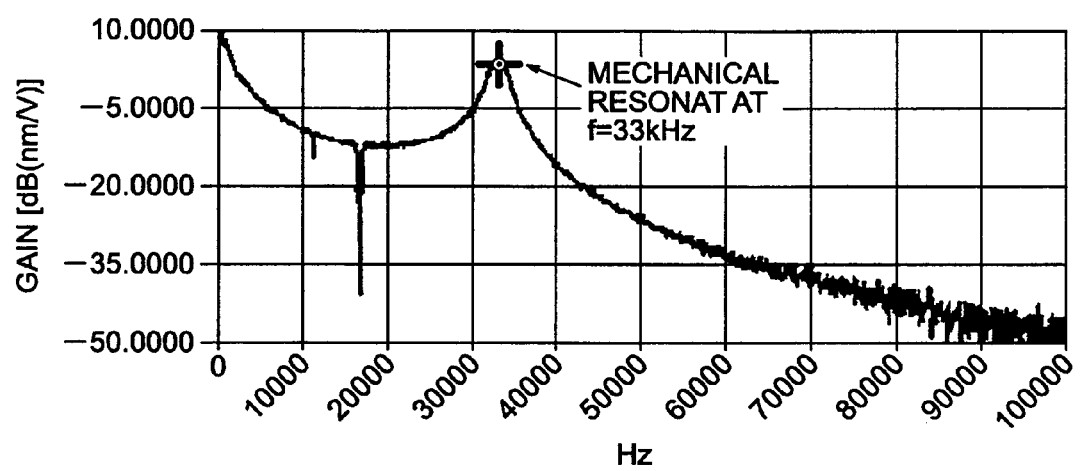
FIG. 10 is a view showing a measured frequency response of the micro actuator.

FIG. 10 shows a measured frequency response of a micro actuator.

The micro actuator was evaluated by making use of a LDV (Laser Doppler Vibrometer). Laser beams of the LDV were focused on a table of the micro actuator to measure an output displacement for an input signal in a frequency band of 0 to 100 kHz. V_pp=7V and V_offset=3.5V were applied as an input signal. A measured electric resistance of a thermal actuator of the micro actuator was 21 kΩ. An electric power consumption of the micro actuator was 5.8 mW.

$$\left(P = \frac{V^2}{R} = \frac{3.5^2}{2100} = 5.8 \ [mW]\right)$$

Further, a mechanical resonance frequency of 33 kHz higher than 16 kHz prescribed in specifications was observed.

The invention claimed is:

1. A magnetic disc apparatus comprising: a micro actuator for a two-stage actuator, which comprises a first stage and a second stage; and a slider mounted to the micro actuator and having a head element to perform recording and reproduction into/from a magnetic disc, wherein a thermal actuator and a spring part are provided on a table, on which the slider is put, the thermal actuator is connected to the slider, and the thermal actuator comprises a V-shaped thin film resistance.

2. The magnetic disc apparatus according to claim 1, wherein the thermal actuator and the spring part are formed integral with the table.

3. The magnetic disc apparatus according to claim 1, wherein the spring part comprises a parallel flat plate spring.

4. The magnetic disc apparatus according to claim 1, wherein the thin film resistance is formed from silicone and a metal.

5. The magnetic disc apparatus according to claim 1, wherein the thermal actuator is arranged on both sides of the table.

6. The magnetic disc apparatus according to claim 1, wherein the spring part is formed on a surface thereof with a wiring for connection of the slider and the micro actuator.

* * * * *